United States Patent Office 3,220,158
Patented Nov. 30, 1965

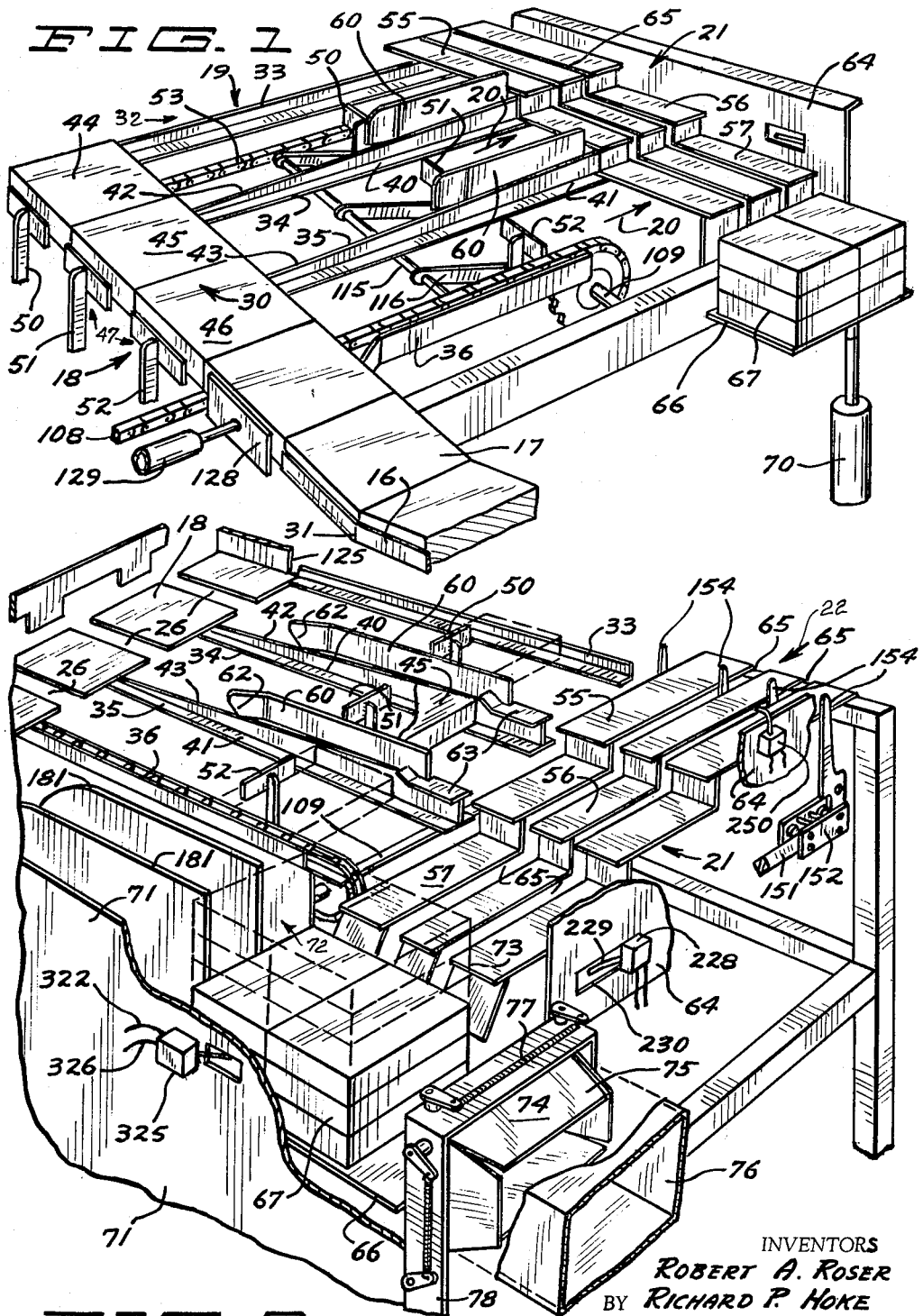

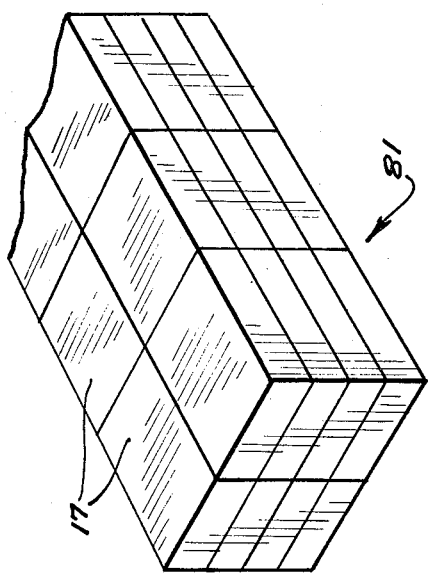
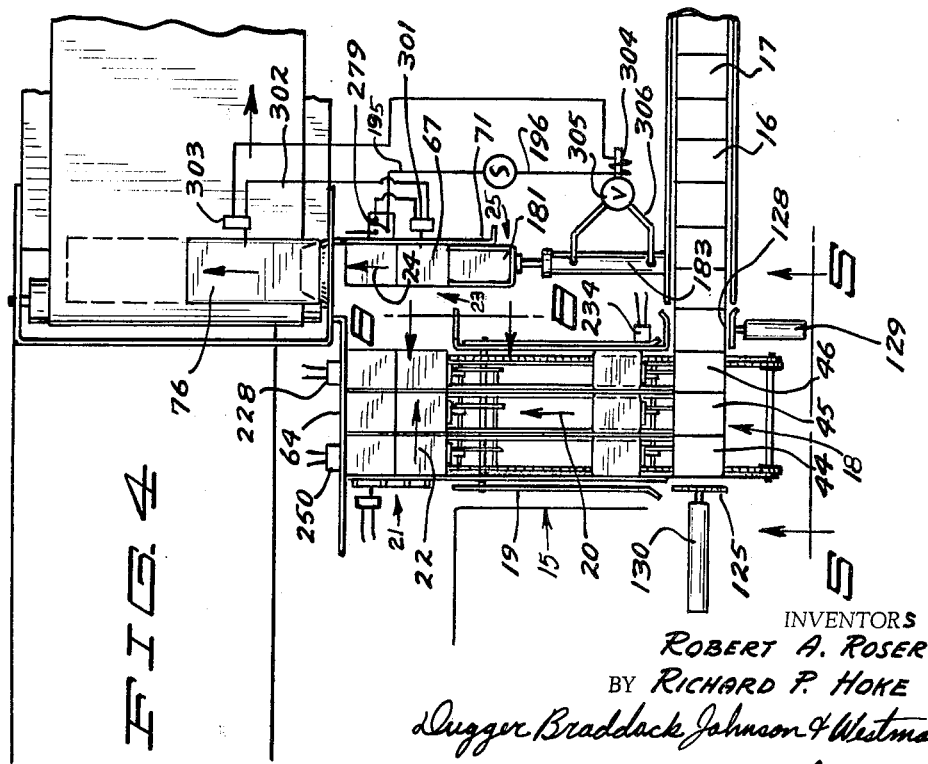

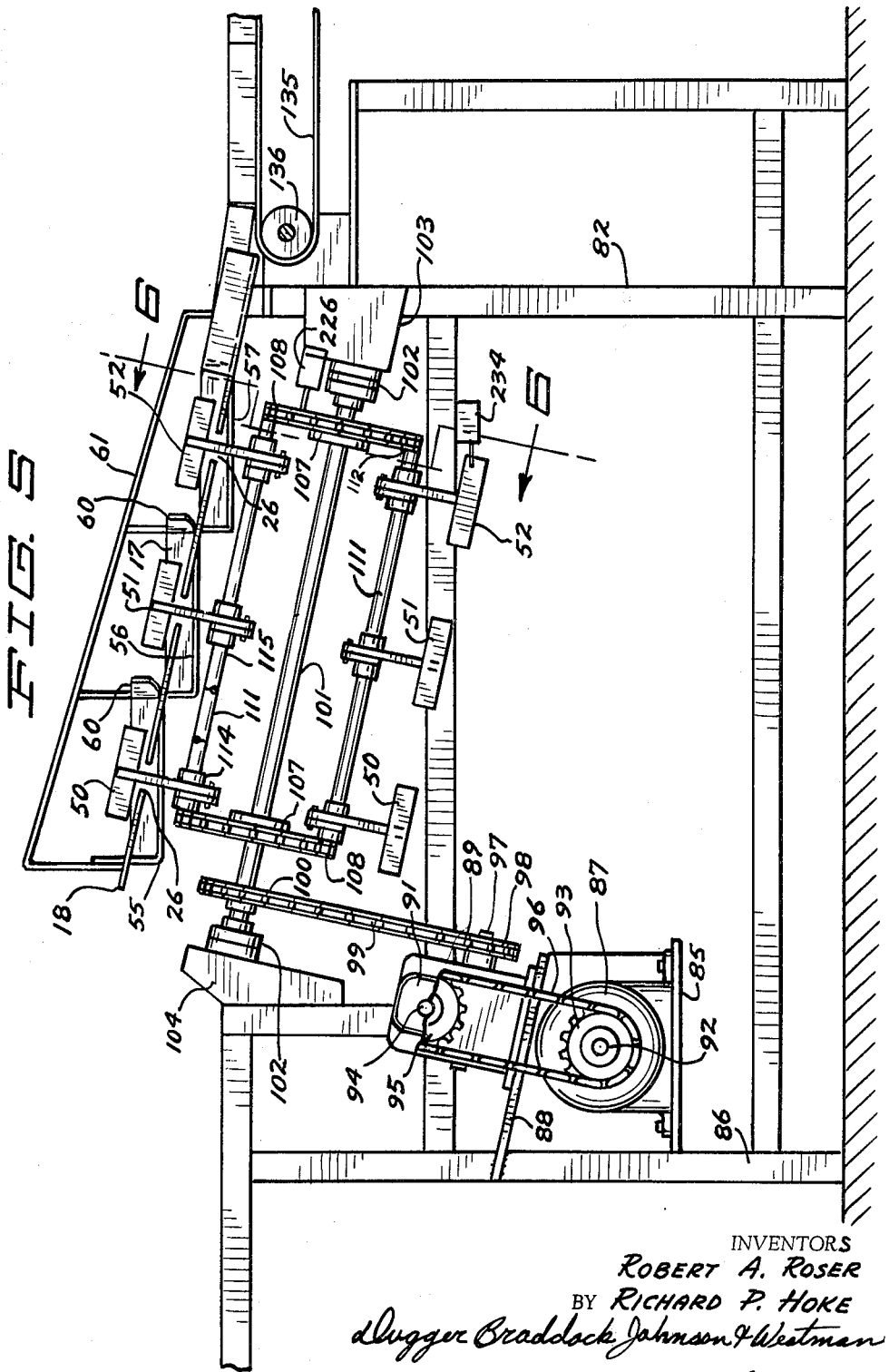

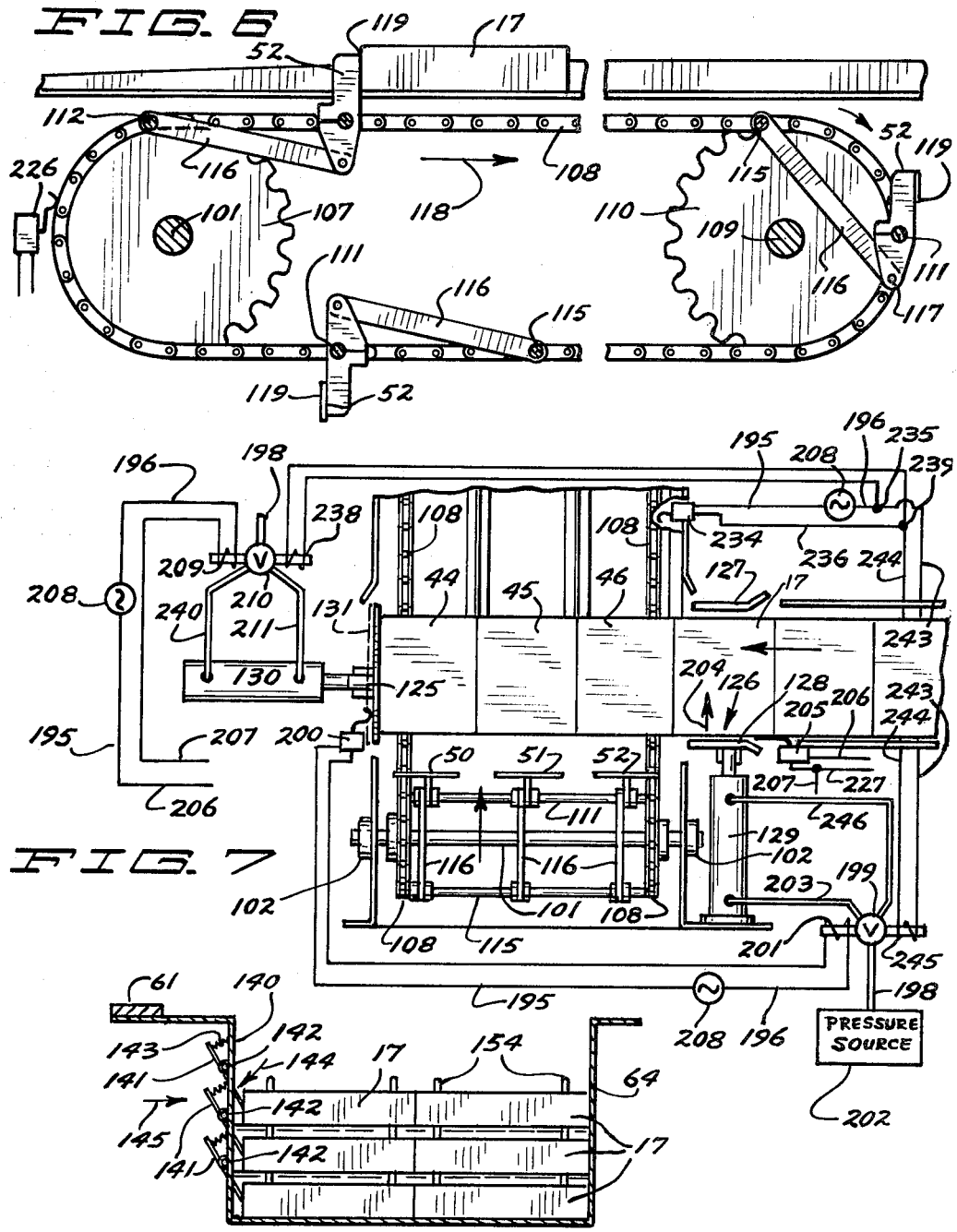

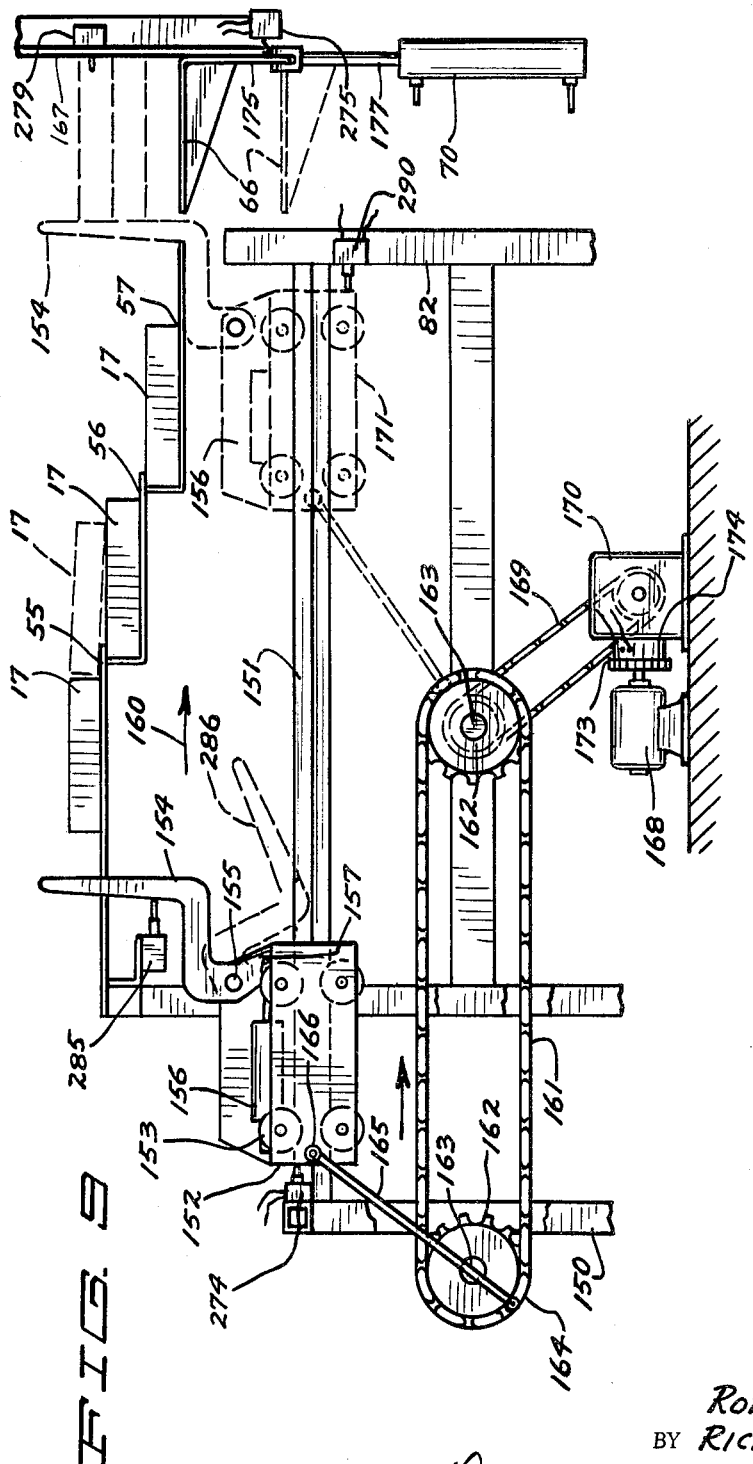

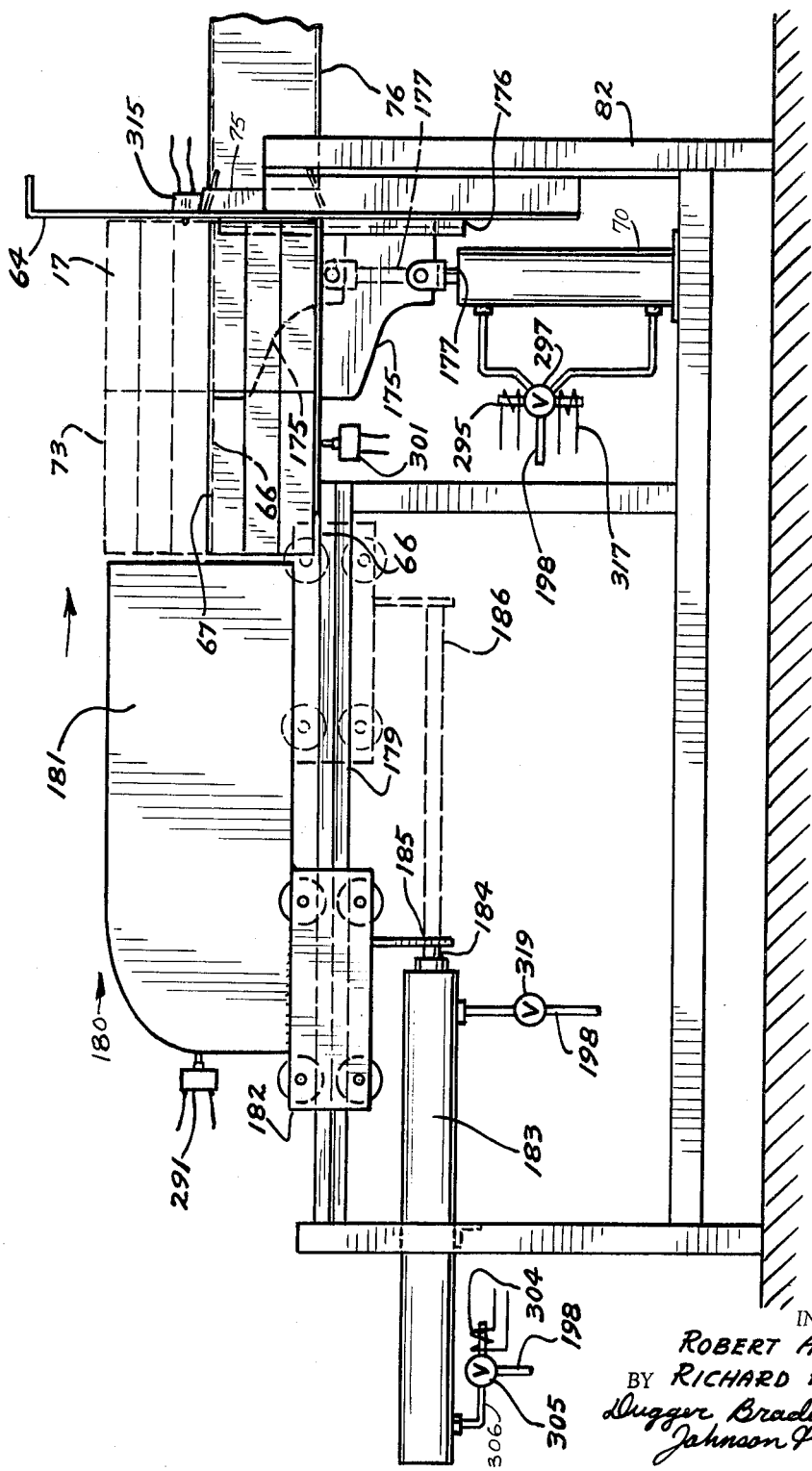

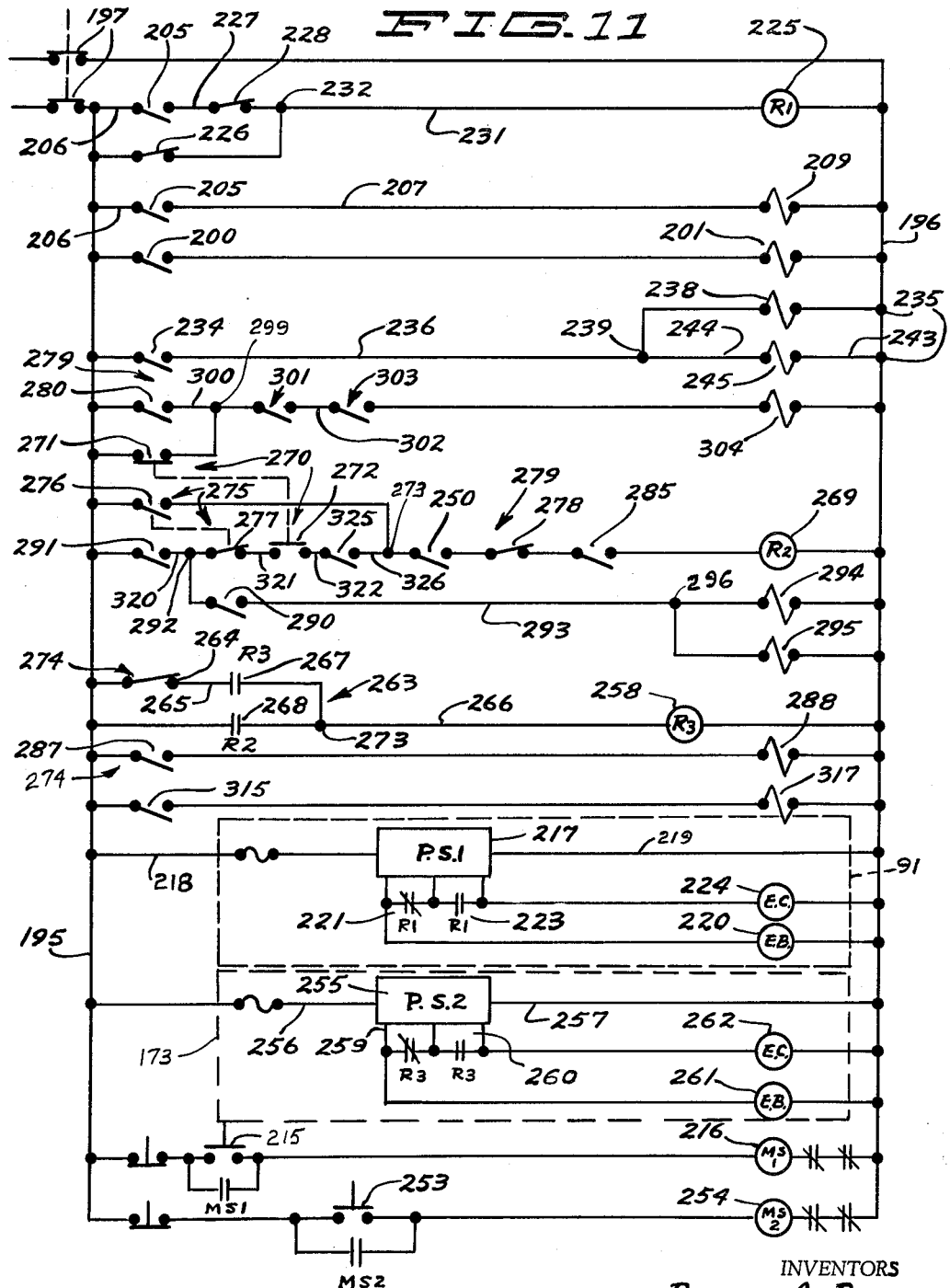

3,220,158
PRODUCT ARRANGER
Robert A. Roser, Minneapolis, and Richard P. Hoke, St. Paul, Minn., assignors to Thiele Engineering Company, Minneapolis, Minn., a corporation of Minnesota
Filed Sept. 6, 1962, Ser. No. 221,736
19 Claims. (Cl. 53—164)

The present invention has relation to a package arranger and more particularly to a machine which will receive packages from a conveyor belt, arrange the packages into stacks and pack them into outer shipping cases automatically.

At the present time carton or package forming equipment is highly automatic as well as the filling and closing equipment for these packages. However, the job of arranging the filled and closed packages into suitable stacks which can be placed into shipping cases has involved a great deal of manual labor. Various machines have been advanced for doing this job, but none have proved entirely satisfactory.

The most serious drawback has been the fact that the machines presently in use are slow, hard on the packages and product and generally are limited to only one size of package stack. Thus if different size shipping cases are to be used, the machine must be completely revamped in order to handle changes in stack size.

The device shown in the present invention, on the other hand, illustrates a product or package arranger which receives packages containing food or other product from a conveyor belt and automatically arranges the packages into suitable stacks having the desired height, length and width. The stacks can be changed to include a different number of packages to meet varying conditions by adjustment of limit switches and stop fences.

In a device made according to the present invention the packages are moved from the conveyor over a shingling deck. The shingling deck is a series of guides that guide each package from position wherein adjacent packages lie in a common plane to position wherein the packages being moved are arranged vertically offset like a series of steps. The packages are transferred from the guides of the shingling deck to a step deck and then are moved in a direction along the steps by suitable equipment. The bottom of the packages on each successively higher step is above the top of the package on the step below it. When the top package slides off its step it will move on top of the packages on the step next below it. Then the two top packages will be moved on top of the next lower step until a stack of the desired size is formed.

When all of the packages are stacked and vertically in register the stack is moved onto a platform from which it is mechanically pushed into a suitable shipping case.

By changing certain limit switches, modifying the shingling deck slightly and moving stop fences, the number of packages in the stack can be changed so that different size stacks can be made.

The product arranger made according to the present invention is a simple unit and is an extremely high speed arranger. The arranger is gentle with the packages while they are stacked and fragile products are not damaged during the stacking operation. As high as 250 packages per minute can be stacked with the device made according to the present invention even with fragile products in the packages. With a stable product the packaging speed is virtually unlimited. All components of the arranger are electrically interlocked so that there will be no mechanical interference between the packages or with the mechanisms used for the various stacking operations.

It is an object of the present invention to present an automatic package arranger.

It is a further object of the present invention to present a package arranger which can stack individual packages into stacks suitable for mechanical insertion into an outer shipping case.

It is a still further object of the present invention to present a package arranger that is high speed and handles the packages gently.

Other and further objects are those inherent in the invention herein illustrated, described and claimed, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIG. 1 is a part schematic, part perspective view of a shingling deck and an infeed conveyor used on a product arranger made according to the present invention;

FIG. 2 is a part schematic, part perspective view of the device of FIG. 1 as viewed from an opposite side thereof;

FIG. 3 is a perspective view of a stack of packages that may be stacked on a machine made according to a modified embodiment of the present invention;

FIG. 4 is a part schematic top plan view of the product arranger illustrated in FIG. 1;

FIG. 5 is an end elevational view of a shingling deck of the device made according to the present invention taken as on line 5—5 in FIG. 4;

FIG. 6 is a fragmentary sectional view taken as on line 6—6 in FIG. 5;

FIG. 7 is a fragmentary enlarged top plan view of an infeed portion of the device made according to the present invention illustrating mechanism for stopping the package infeed line and releasing the packages at the start of the shingling deck operation;

FIG. 8 is a schematic representation of a device for retaining packages in position and taken as on line 8—8 in FIG. 4;

FIG. 9 is an end elevational view of a cross head stacker utilized for stacking the packages after they have been positioned on a stepped platform deck;

FIG. 10 is an end elevational view of a plunger for inserting a stack of packages into a shipping case; and FIG. 11 is a schematic representation of an electrical circuit utilized for controlling a product arranger made according to the present invention.

General operation

Referring to the drawings and numerals of reference thereon, first specifically to FIG. 4, a product arranger 15 is generally illustrated. The product arranger 15 consists of several individual sections that serve different functions and briefly, by way of orientation, will be explained here. The arranger includes a continuous running input conveyor 16 carrying a plurality of packages 17 which are to be stacked for case loading. The input conveyor has an inclined portion deck loading section 18 which is in line with and forms the infeed end of a shingling deck 19. Three packages at a time travel in direction as indicated by arrow 20 across the shingling deck which offsets the packages in a vertical direction. The packages are moved onto a step deck 21. A second group of three packages is also moved onto the step deck 21 and the packages are then stacked one on top of the other by moving them in direction as indicated by arrow 22 onto a platform loading area 23. The stack of packages is then moved until it is properly positioned and then moved in direction as indicated by arrow 24 to be loaded in a shipping case by loading mechanism illustrated generally at 25.

*Mechanical components*

Referring specifically to FIGS. 1 and 2, a schematic representation of the shingling deck 19 and step deck 21 is shown together with a portion of the input conveyor 16 and the inclined deck loading section 18 of the conveyor. The shingling deck area 19 is located to one side of the input conveyor 16. The packages 17 move from the conveyor in direction as indicated by arrow 30 onto the inclined portion of the input conveyor. The conveyor 16 is a belt type conveyor and the belt 135 (FIG. 5) terminates where the deck loading section 18 starts, as at 31. The deck loading section 18 is a slide up which the packages 17 are pushed by the impetus of the packages on the conveyor.

The shingling deck 19 is located at the side of the deck loading section 18 nearest the step deck 21. The shingling deck is made up of a plurality of guide rails indicated generally at 32. In the form of the invention shown three packages will be moved simultaneously from the deck loading section of the conveyor to the step deck across the shingling deck. Thus the guide rails include an upper edge guide rail 33, a first intermediate guide rail 34, a second intermediate guide rail 35, and a lower guide rail 36. The upper guide rail 33 and the lower guide rail 36 are angle iron shaped and support one side edge of their respective packages as the packages move across the shingling deck.

The intermediate guide rails are substantially identical in construction and have two separate portions. Each of the intermediate guide rails has an L-shaped guide portion 40 and 41, respectively, each of which receives one side edge of one of the boxes transported along the shingling deck and guides it from the deck loading section of the conveyor to the step deck. The intermediate guide rails 34 and 35 have upper guide portions 42 and 43, respectively, each of which supports the side edge of a package and guides it upwardly from a low point at the deck loading section 18 to its proper location on the step deck.

Explained another way, in the embodiment of the invention shown in FIGS. 1 and 2, three packages are moved across the shingling deck 19 simultaneously by a shingling deck pusher mechanism 47. A first package or upper package 44, an intermediate package 45 and a lower package 46 are moved. The upper package 44 is moved by a first paddle 50. The intermediate package is moved by a second paddle 51 and the lower package is moved by a third paddle 52. The paddles are attached to and driven by a chain and sprocket arrangement illustrated generally at 53 forming a part of the shingling deck pusher mechanism. The specific drive for the paddles will be more fully explained later. The paddles move in direction as indicated by arrow 20 from the deck loading section 18 to the step deck 21. The deck loading section 18 has provided slots 26 for the individual paddles.

As can be seen, when the paddles are moving in direction as indicated by arrow 20, the packages 44, 45 and 46 will be pushed by the paddles 50, 51 and 52 respectively. The upper edge of upper package 44 will follow along guide rail 33 and the lower side edge portion of upper package 44 will contact the upper guide portion 42 of the first intermediate guide rail 34. Thus as package 44 moves along, the portion resting on intermediate guide rail 34 will move upwardly and when the package 44 has reached the step deck, the package will rest on a first or upper step platform 55.

The intermediate package 45 will be pushed along the lower guide portion 40 of first intermediate rail 34 and also will be guided by the upper portion 43 of second intermediate rail 35. The upper guide portion 43 will raise the lower side portion of the package 45 and the package will come to rest on a second or intermediate step platform 56 when it reaches the step deck.

The lower package 46 will be guided by a lower portion 41 of second intermediate rail 35 and also by lower guide rail 36. The lower package 46 will rest on a third or lower step platform 57 when it reaches the step deck.

A pair of separator bars 60, 60 are fixedly attached to an upper frame 61 (shown in FIG. 5) and serve to keep the packages on their proper guide rails and separated. The separator bars have a plow shaped lead-in portion 62 to prevent interference with the packages. The plow shaped portions guide the packages into their proper position. A pair of guide shoes 63, 63 are also attached to the intermediate guide rails and act on the packages as they are moved across the shingling deck to make sure that the packages are in position to slide onto their respective step platforms without any interference with the step platform immediately above it.

The step platforms can be of sufficient width so that any number of packages can be placed across each step platform. As shown two packages are positioned on each step.

The packages contact a stop fence 64. At that time the packages on the third step platform 57 will contact a finger 229 of limit switch 228. This partially completes an electric circuit which will, when completed, operate to move a plurality of pusher fingers 154 along provided slots 65 in the step deck and against the packages on the step platforms. The fingers move the packages in direction as indicated by arrow 22. The packages then are stacked one on top of another and are deposited on a loading platform 66 in a three high, two deep stack 67. The packages rest against an end fence 71. The platform 66 is mounted on a hydraulic elevator cylinder 70 which, when actuated, lowers the platform to be aligned with a case loading chute 74. If a proper switch is pushed manually another stack of packages, three high one wide and two deep will be placed on top of the previous stack before the packages are placed into the shipping case. The second stack of packages is shown in dotted lines at 73 in FIG. 2. When the desired number of packages are stacked on platform 66, (either 6 or 12 as the case may be) suitable circuits will be closed to actuate a case loading pusher mechanism illustrated generally and schematically at 72 in FIG. 2. The pusher mechanism forces the stack of packages through the loading chute 74.

The loading chute has guide flaps 75 which fit inside of a cardboard shipping case 76 which in turn is held by suitable clamping mechanism 77 to a chute frame 78. The case 76 is an outer shipping case used for shipping a stack of packages.

As shown at 81 in FIG. 3, for purposes of illustration, a stack of packages can be made that is four packages high, two wide, and three packages long by re-arranging the structural components of the machine. The addition of another step or segment to the shingling deck and step deck would make the stack four packages high. By making the step decks wider three packages could be placed thereon before the stack cross head and fingers operate to make the stack. Thus by changing the position of the stop fences and adding guide rails any desired stack size can be obtained. Referring specifically to FIGS. 5 and 6, the drive arrangement for the pushers on the shingling deck is shown. The shingling deck is mounted on a main frame 82. A motor support plate 85 is fixedly attached to one of a plurality of legs 86 of the main frame and supports an electric motor 87. A gear reducer support plate 88 is also fastened to a leg 86 and supports a gear reducer 89. The motor 87 has an output drive shaft 92 on which a sprocket 93 is drivably mounted.

The gear reducer has an input shaft 94 on which a second sprocket 95 is mounted and drives the shaft through an electrically operated clutch and brake unit 91. A chain 96 connects the sprocket 93 with the sprocket 95 on the gear reducer. The gear reducer also has an output shaft 97 which, when the electrically operated clutch 91 is energized is rotating at a speed substantially slower than that of the motor output shaft 92. The output shaft 97 of the gear reducer has a sprocket 98, drivably mounted thereon which is connected with a chain 99 to a sprocket 100 which in turn is drivably mounted on a cross shaft 101. The cross shaft 101 is rotatably mounted in suitable bearings 102, 102 which in turn are mounted on brackets 103 and 104 which in turn are mounted to the main frame 82.

The cross shaft 101 is the drive shaft for the shingling deck pusher mechanism. A pair of drive sprockets 107, 107 are drivably mounted on the shaft 101 and a pair of spaced drive chains 108, 108 are mounted on the sprockets. A shingling deck pusher mechanism idler shaft 109 is rotatably mounted with respect to frame 82 at the unloading end of the shingling deck, adjacent the step deck. The idler shaft 109 has a pair of idler sprockets 110, 110 drivably mounted thereon and chains 108 fit over the idler sprockets.

There are three sets of the first, second and third pusher paddles 50, 51 and 52 on the pusher mechanism 47. The paddles of each set are transversely aligned and are mounted on a separate paddle shaft 111 each of which in turn is attached to and extends between the two chains 108, 108 at special attachment chain links 112. The shafts 111 are pivotally mounted on the attachment links 112 and the paddles are clamped onto the shafts 111 with separate clamping mechanism 114.

An idler shaft 115 is utilized with each of the sets of pusher paddles. The idler shafts 115 extend between the two chains 108 parallel to and spaced from their paddle shafts 111. The idler shafts 115 are also attached to special attachment links 112 of the chains. A separate drag link 116 is pivotally mounted to each of the paddles, as at 117, on a lower portion thereof and extends to and is mounted on the idler shaft 115 for the corresponding set of paddles. Thus for each of the three sets of paddles there are three drag links, an idler shaft and a pivot shaft. As the motor 87 runs, the chains are driven so that paddles move in direction as indicated by arrow 118 in FIG. 6.

The deck loading section 18 has provided slots 26 through which the paddles move as the chain and sprockets are powered.

Each of the paddles has a pusher element 119 which engages the packages with which it is aligned, first at the loading section 18 of the shingling deck, and which continues to engage the package as the package is pushed across the guide rails of the shingling deck and onto the step deck. It will be noted in FIG. 6 that because of the geometry of the paddles, drag link and idler shaft, the pusher elements of the paddles will remain substantially parallel to the surface of the package that they engage, both when they engage the package at the loading section 18, and when they are being disengaged from the package and the package is deposited on the step deck.

Thus by using this linkage there is no tendency of the paddles to dig into the side surfaces of the box as the paddles go around the sprockets on the discharge end of the shingling deck pusher mechanism. This increases the reliability of the mechanism and eliminates jamming during loading and unloading.

Referring specifically to FIG. 7 it will be seen that as the packages are pushed up the loading section 18 they will engage a package back up member 125. The back up member 125 prevents the packages from moving beyond their proper locations. The belt of the input conveyor then merely slips against the bottom of the packages on the conveyor while the back up is in position.

The device is operated by limit switches and solenoid controlled valves, so that before the paddles engage the packages on the loading section 18 of the shingling deck, a conveyor line clamp mechanism illustrated generally at 126 will be actuated. The line clamp mechanism includes a backstop 127 and a slidable line clamping member 128. The slidable line clamping member 128 is actuated with an air cylinder 129 which in turn is actuated with air under pressure delivered through a suitable solenoid valve arrangement illustrated schematically in FIG. 7, which will be more fully explained later. The pusher assembly for the shingling deck and the clamping mechanism 126, as well as the stop member 125 are all electrically interlocked together to perform in sequence.

The back up 125 is operated with an air cylinder 130 and can move to position as shown in dotted lines at 131 to and away from its stopped position.

When the paddles of the shingling deck pusher mechanism are clear of deck loading section 18 the proper control circuits are closed and a solenoid opens a valve to operate cylinder 129. The cylinder 129 then moves clamp member 128 against the package 17 directly aligned with it and this in turn moves the package against back stop 127 and exerts a clamping force on the package.

After this occurs the cylinder 130 is actuated through the instrumentality of a limit switch and solenoid operated valve and the cylinder 130 moves back up member 125 to position as shown in dotted lines in 131. Thus, the packages on the inclined portion 18 are released from pressure and are free to move.

Each of the paddles of the pusher mechanism for the shingling deck then engages the package aligned with it. The paddles push the packages along the guide rails and onto the step deck. As soon as the packages and paddles have cleared the inclined portion 18 on their way to the step deck, cylinder 130 is actuated in opposite direction and the back up 125 is moved to its original position. The line clamp member 128 is also released. This permits the packages on the input conveyor to move forwardly up the inclined portion 18 in position for engagement with the paddles of the pusher mechanism for the shingling deck.

As seen in FIG. 5, the input conveyor includes a belt 135 which is driven in a conventional manner and is mounted over an idler roller 136. The packages 17 merely rest on the top of the belt and are moved by friction between the packages and the belt. The belt 135 terminates where the inclined deck loading section 18 starts. Thus the packages on the inclined section 18 are pushed by the packages carried on the belt 135.

Referring specifically to FIG. 8, there is schematically shown an arrangement for preventing the packages from bouncing back onto the guide rails once they have been placed on the step deck. As can be seen, the packages 17 are arranged in vertically offset rows on the step deck. A support member 140 is mounted on frame 61 and extends at an angle with respect to the step deck and above it. A bounce finger 141 is pivotally mounted, as at 142, to the support member 140. A spring 143 biases each of the fingers toward the stop fence 64 on the shingle step deck. There is one bounce finger for each of the step decks.

The bounce fingers 141 are stopped so that they will not rotate in direction as indicated by arrow 144 past position shown in FIG. 8. However, they are free to rotate in an opposite direction from that indicated by arrow 144. Thus, as the packages move in direction as indicated by arrow 145, the bounce fingers will move out of the way against the spring pressure from spring 143 and permit the packages to slide underneath. As soon as the paddles have pushed the packages onto the step deck the fingers are free to swing back in direction as indicated by arrow 144 under the urging of springs 143 until they reach their stop position and the packages no longer can bounce off or become dislodged from the step deck.

The bounce fingers aid in alinement of the packages as well as preventing them from bouncing off the step deck. The bounce fingers permit a higher speed operation of stacking packages without loss of accuracy of the stacking operation.

Referring specifically to FIG. 9, the cross feed, for removing the packages from the step deck is shown. It will be seen the first, second and third step platforms 55, 56 and 57, respectively are loaded with packages 17. A cross rail frame 150 is mounted onto the main frame 82 of the machine and a cross rail 151 is mounted on the frame and extends in the longitudinal direction of the step platform and transverse to the direction of movement of the packages on the shingling deck. A cross head 152 is mounted on the cross rail 151 for movement therealong. The cross head 152 is mounted on a plurality of rollers 153 which are rotatably mounted on the cross head and engage the cross rail. The cross rail is diamond shaped in cross section with the top and bottom edges of the rail being engaged by the rollers 153, which have grooves to receive these edge portions.

A plurality of pusher fingers 154, two for each of the packages positioned across the individual step decks, are mounted on a shaft 155 which in turn is mounted on the cross head 152. The shaft 155 is rotatably mounted to the cross head and the fingers are fixedly attached to the shaft. A cylinder 156 is mounted on the cross head and is positioned to engage a downwardly projecting portion of one of the fingers as at 157. Before the cross head is driven suitable circuitry is completed so that fluid under pressure is directed to cylinder 156 which holds the fingers in upright position.

The cross head is driven in direction by arrow indicated at 160 through the instrumentality of a chain 161 mounted on sprockets 162, 162 which in turn are mounted on a pair of shafts 163, 163, which are rotatably mounted with respect to the frame. Chain 161 has a drive link 164 and a connecting rod 165 pivotally mounted as at 166 to the cross head. The front shaft 163 is driven with a chain and sprocket set 169 from a gear reducer 170. The gear reducer 170 is driven with a motor 168 through a chain and sprocket set 173. The sprocket of the gear reducer operates through a second electrically operated clutch and brake unit 174.

With the cross head at its starting position as indicated in full lines in FIG. 9, and with the proper circuits completed the fingers 154 will be in an upright position and in position ready to move the packages off the step platforms. As the chains move, the cross head moves in direction as indicated by arrow 160 and the fingers engage the two packages on the upper step platform 55 and moves them forwardly, as shown in dotted lines in FIG. 9, onto the packages on platform 55 and the four packages (stacked two high and two across) together are moved forwardly onto the third packages. The stack of packages, three high, one wide and two deep, is pushed onto the platform 66 and positioned against a fence 167.

When the cross head moves to its position as shown in dotted lines at 171 in FIG. 9 a circuit is completed which reverses the flow of fluid under pressure to cylinder 156 and the fingers 154 are immediately retracted or lowered for the back stroke. Thus, the paddles for the shingling deck can move additional packages onto the step platforms while the stacking cross head is retracting without interference with the fingers 154. This permits more rapid operation of the machine.

Referring specifically to FIG. 10, the mechanism utilized for moving the stacks of packages from platform 66 into a shipping case is shown. The platform 66 has a support member 175 fixedly attached thereof. The support member 175 is vertically slidably mounted on a slide 176 which in turn is fixedly attached to the main frame 82 of the product arranger. The elevator cylinder 70 has a slidably mounted piston rod 177 with a clevis at an outer end thereof which in turn is pivotally mounted to the support 175 for the elevator platform. The elevator cylinder is moved to position as shown in full lines in FIG. 10 before the case loader is actuated.

The case loader cross head assembly 180 includes a pair of stack pusher members 181 which are mounted on a cross head 182 which in turn is slidably mounted between a pair of cross rails 179, much like the cross head assembly for the step platforms. An air cylinder 183 is mounted with respect to the machine frame and has a slidably mounted rod 184 which in turn is connected to the cross head 182, as at 185. When the elevator platform 66 is lowered, as shown in full lines in FIG. 10 the packages are ready to be loaded into a shipping case. When proper circuitry, which will be explained later, is completed the cylinder is extended under pressure to position as shown in dotted lines at 186 and forces the pusher members 181 against the stacked packages, through the chute 75 and into the case 76 in which the packages are to be placed. The elevator platform moves to position as shown in dotted lines in FIG. 10 to receive the stack of six packages and then lowers so the packages can be placed into shipping case 76.

If a stack of twelve packages is to be placed into shipping case the elevator platform receives the first stack of six packages as before and lowers. However, the case loader does not operate immediately. A second stack of six packages is positioned as shown in dotted lines at 73 in FIGS. 2 and 10. The case loader pusher mechanism then operates as before and the twelve packages are placed into a shipping case. Also, stop fence 167 can be moved so that two stacks of packages are placed side by side on the elevator platform, as shown in FIG. 3. If desired the elevator can be lowered and two more stacks placed on top of the original stack making a stack of 24 packages. Other modifications of the size of the package groups can be made as desired.

Electrical controls and operation

The previous discussion of the mechanical operation of the machine and the function of the various mechanical components did not include explanation of the utilization of interlocking limit switches and electrical controls to make sure that the various functions of the machine did not cause interference with one another. Referring specifically to FIG. 11, which is a schematic wiring diagram of the electrical components of the machine as well as the various figures which show the physical position of the limit switches shown schematically in FIG. 11, the following will be a complete résumé of the operation of the machine utilizing the electric circuit diagram.

The product arranger made according to the present invention, in the form as disclosed, is designed so that a stack of six packages can be inserted into a shipping case, or if desired, a stack of twelve packages can be placed in a shipping carton. The selection of how many packages should be placed in the shipping carton is controlled by a six pack-twelve pack selector switch illustrated generally at 270 in schematic wiring diagram FIG. 11. The fundamental operation of the selector switch is to change the control circuit so that the stacking pusher will operate twice before the case loader pushes the stack of packages into the outer shipping carton. If a six pack of packages is to be placed in the shipping carton the stacking pusher operates only once before the case loader pushes the stack into the carton.

The normal sequence for loading a stack of six packages into a carton is that the packages are on the step deck, the stacking pusher will be initiated and will move the stack on to the elevator platform 66, the elevator will lower while the stacking pusher returns, and then the case loader will push the six packages off the lowered elevator platform and into the outer shipping case. When twelve packages are to be used the stacking pusher first pushes six packages onto the raised elevator platform 66, the elevator lowers and remains in this position until a second stack of six packages is placed on top of a first stack of six packages by the stacking pusher. When the twelve packages are placed on the elevator platform 66, in its lowered position, the case loader will operate and will push the entire stack of twelve packages into an outer shipping case. Of course, the holder for the outer shipping case will have to be changed for different size stacks of packages.

The control for the input conveyor belt 135 as well as the motor for powering it is not shown. The input conveyor can be of any standard design and will be controlled independently of the operation of the rest of the machine in that the conveyor belt 135 can be running continuously without affecting the stacking of the packages. The other controls are wired through a main on-off switch 197.

Assuming that the conveyor belt is continuously running, and also assuming that packages are in place on the deck loading section 18 of the machine, it will be seen in FIG. 7 that a finger of a limit switch 200 will be contacted by the end package of the packages on the deck loading section 18 and at the time it is contacted by this end package the switch contacts will close. The switch contacts are electrically connected at a first side thereof to a main power line 195 and at a second side to a solenoid coil 201. As can be seen schematically in FIG. 11 and also in FIG. 7, the solenoid is connected to a second line 196 from a power source 208 and when the circuit is completed will operate one side of a solenoid controlled valve 199 which directs air under pressure from a pressure source 202 through a conduit 198 to valve 199 and then through a conduit 203 into one end of the cylinder 129. The cylinder 129 in turn moves the line clamp member 128 against the package aligned therewith and forces this package against back stop 127. The packages on the input conveyor belt 135 will no longer be able to move forwardly up the deck loading section 18. This prevents any additional pressure from being exerted on the three packages positioned on the deck loading section 18.

When the clamp member 128 extends and moves toward the back stop 127 in direction as indicated by arrow 204 a limit switch 205 will be closed by an edge portion of the clamp member. This will cause two separate operations to occur.

A first wire 206 connected to a first side limit switch 205 is electrically connected to main power line 195, which is connected to a suitable power source 208. A second side of switch 205 is connected to a wire 207 that in turn is electrically connected to a solenoid coil 209 which operates one side of a valve 210 which in turn directs fluid under pressure through a conduit 211 to one side of back-up cylinder 130 which in turn moves back-up member 125 to its dotted position as shown at 131 and releases the three packages positioned on deck loading section 18. Thus the packages on deck loading section 18 are free to move under force of the paddles for the shingling deck pusher mechanism 47.

As stated previously the drive for the shingling deck pusher mechanism includes an electric motor 87 which drives through an electrically operated clutch and brake 91. Referring specifically to the schematic wiring diagram in FIG. 11 it can be seen that the motor 87 is manually started with a push switch 215 that has a first side electrically connected to main power line 195 and electrically connected at a second side thereof to a motor starting relay 216 that is electrically connected to line 196. The starter relay operates contacts to connect the motor 87 to a three phase power supply in a conventional manner (not shown).

When the motor 87 is running, the sprocket 95 on gear reducer 89 will be turning. However, until a suitable circuit has been completed to energize the electric clutch portion of the first clutch-brake unit 91 the paddles for the shingling deck will not be driven.

As can be seen in FIG. 11 a power supply unit 217 is electrically connected through suitable wires 218 and 219 to power line 195 and 196. The power supply 217 rectifies the alternating current and thus provides a direct current source of suitable voltage for operation of the first electric clutch and electric brake unit 91.

An electric brake illustrated schematically at 220 is controlled through normally closed contact 221; the contacts energize an electric magnet which causes the brake to exert a braking effort on the input shaft of the gear reducer. This prevents the paddles for the shingling deck mechanism from being moved whenever the electric brake is energized. This is to prevent accidental pushing of the packages on the deck loading mechanism and a positive stopping of the paddles. The electrically controlled clutch and brake unit is of conventional design available commercially, for example, a unit manufactured by Warner Electric Brake and Clutch Company of Beloit, Wisconsin, and which handles 60 in.-lb. of torque has been found to be satisfactory.

The chain and paddle assembly for the shingling deck is driven whenever an electric clutch 224 of the clutch-brake unit is energized. The electric clutch 224 is energized whenever pair of contacts 223 are closed. The contacts 221 and 223 are both controlled simultaneously by a relay coil 225. Whenever the relay coil 225 is energized contacts 221 open and contacts 223 close. The electric clutch is operated by an electro-magnet. When the contacts 223 close the clutch is energized thereby causing sprocket 95 to drive input shaft 94 or reducer 89. The brake is released automatically whenever contacts 221 are open.

The circuit used to control relay 225 is completed in one of two ways. A first side of relay 225 is electrically connected to a main power line 196. A lead 231 is electrically connected to the other side of relay coil 225. A normally closed limit switch 226 is electrically connected to lead 231 as at 232 at a first side thereof and to line 195 at a second side thereof. The normally closed switch 226 is positioned to ride on one of the chains 108 adjacent drive sprocket 107 as seen in FIGS. 5 and 6. As long as one of the sets of paddles for the pusher mechanism is not engaging switch 226 an electrical circuit is completed to relay 225 and the electric clutch is energized, thus driving the pusher mechanism. Whenever one of the sets of paddles engages the limit switch 226 it is opened and this circuit to relay 225 is broken. Thus the contacts 223 will open and the electric clutch is no longer energized. The electric brake will then be energized and cause the pusher mechanism to stop.

Whenever a set of paddles is positioned adjacent the deck loading section 18 and limit switch 226 is open, the electric clutch relay 225 will be energized only when a separate circuit wired in parallel with limit switch 226 is completed. This separate parallel circuit includes limit switch 205, which as stated previously is closed whenever the line clamp member is clamping onto a package and preventing packages on the input conveyor from moving up onto the deck loading section. Limit switch 205 is electrically connected at a first side thereof to power line 195. In addition to being connected to wire 207, the second side of switch 205 is electrically connected to a wire 227. Wire 227 in turn is electrically connected to a first side of a limit switch 228. A second side of limit switch 228 is electrically connected to lead wire 231.

Limit switch 228 is a normally closed limit switch physically positioned, as seen in FIGS. 1 and 2, on stop fence 64 just above lower step platform 57. An operating finger 229 of limit switch 228 extends through an opening 230 in the stop fence and whenever a package on the lower step platform 57 is against the stop fence the limit switch 228 will be opened. However, when there are no packages against the stop fence, the limit switch 228 is closed. Thus with no packages against stop fence 64 and with limit switch 205 closed due to the clamping action on the infeed conveyor line, pressure on the packages on deck loading section 18 is released and the relay 225 is energized, and thus electric clutch 224 is also energized. This will cause the paddles on the pusher mechanism for the shingling deck to be moved. The paddles will each engage one of the packages positioned on the deck loading section 18 and move them across the shingling deck, as previously described.

There are three sets of paddles on the pusher mechanism.

As one set of paddles on the pusher mechanism moves packages across the shingling deck, one paddle of the set of paddles immediately following the operating paddles will, as shown in FIGS. 4 and 5, momentarily engage a limit switch 234 as it moves along the underside of the machine.

Limit switch 234 operates two separate devices. As perhaps best seen schematically in FIG. 7, a first contact of switch 234 is electrically connected to line 195 which leads from power source 208. A solenoid coil 238 is electrically connected at a first side thereof to line 196, at junction 235. A second side of solenoid coil 238 is electrically connected to a line 236, which is also connected to a second contact of switch 234, at junction 239. When the switch 234 is closed, coil 238 will be energized and this will cause valve 210 to be operated in opposite direction from that which coil 209 operates the valve. When valve 210 is actuated by coil 238 fluid under pressure will flow through a conduit 240 to an opposite side of cylinder 130 and move back-up member 125 to its original "stop" position.

A second pair of wires 243, 244 are electrically connected in parallel with the solenoid coil 238 at junctions 235 and 239 respectively. The wires 243 and 244 are connected through a solenoid coil 245 which operates a second side of valve 201 and when energized directs fluid under pressure through a conduit 246 to an opposite side of the line clamping member 128 and releases the packages on the input conveyor so that they can move up the deck loading section 18 of the device. It should be remembered that input conveyor belt 135 is continuously running during these operations.

As stated previously, the actuation of limit switch 234 is momentary and simultaneously the stop member 125 moves to its original stop position and the line clamp is released. Thus packages are again moved onto the deck loading section 18. The paddles will continue to move during this time unless both of the circuits for the electric clutch 224 are broken. When the clamp 125 is moved to its release position, limit switch 205 will open. However, as the paddles have not moved far enough to contact limit switch 226 the relay 225 will still be energized and the paddles will continue to move.

It should be noted that as soon as the end package on the deck loading section 18 contacts limit switch 200 the line clamp will again operate and the back stop 125 will retract.

After the shingling deck pusher mechanism has operated so that there are six packages positioned on the step deck, (two packages on each of the individual step platforms 55, 56 and 57) it will be seen that limit switch 228 will be opened. Once the paddles move back enough to contact switch 228 the pusher mechanism cannot operate until the packages have been cleared from the step deck.

Whenever there are two packages on top step platform 55 a limit switch 250 will be closed. Limit switch 250 is positioned on fence 64 adjacent the top step platform 55.

Although the operation of the machine made according to the present invetion is continuous, each group of packages goes through definite procedures.

The next procedure in the operation of the device made according to the present invention, after the packages have been placed on the step platform, is the stacking operation. The stacking operation of the packages arranged on the step deck occurs when a plurality of fingers 154 contact the packages and moves them in direction along the steps so that the packages on the top step are placed on top of the packages on the middle step and then these packages are placed on top of the packages on the bottom step. The fingers 154 are mounted on a cross head 152 which moves in direction as indicated by arrow 160 in FIG. 9.

As stated previously the cross head 152 is driven through suitable chain and sprockets from a gear reducer 170 which is driven in turn by an electric motor 168. Electric motor 168 is manually started through a motor switch 253 which energizes a motor starter relay 254 and which in turn closes contacts to start the motor. The motor 168 drives through a second electric clutch and brake unit 173, which is identical in operation to the clutch and brake unit used for the shingling deck pusher mechanism. However, the control circuit for the clutch does differ somewhat.

An electric clutch for the stacking pusher includes a power supply 255 which is electrically connected through wires 256 and 257 to wires 195 and 196. The power supply unit 255 supplies direct current for operating the electric clutch and brake, as previously explained. A relay coil 258 controls two sets of contacts, one normally closed illustrated at 259 and another normally open illustrated at 260. Whenever the relay 258 is not energized the normally closed contacts 259 operate to energize the electric brake 261. When the relay coil 258 is energized the normally open contacts close and the normally closed contacts open. The electric clutch 262 is then energized and the brake is released. When the electric clutch 262 is energized the gear reducer 170 is driven and the stacking pusher will be operated by motor 168 through the chain and sprocket arrangement.

The relay coil 258 is electrically connected in a hold circuit illustrated generally schematically in FIG. 11 at 263. A limit switch 274 has a normally closed set of contacts 264 which as shown in FIG. 9 are positioned so that when the cross head 152 is in its home or rearward position the contacts are opened. One side of the contacts 264 is electrically connected to line 195 and a second side is connected through a suitable wire 265 to a first side of a set of contacts 267 operated by relay coil 258. In parallel with this circuit is a set of contacts 268 which are electrically connected to line 195 at a first side thereof and electrically connected to a line 266 at a second side thereof. Line 266 is, in turn, electrically connected to relay coil 258. The contacts 268 are operated by a relay coil 269. The second side of contacts 267 is electrically connected to line 266 at junction 273.

The energization of relay coil 258 is controlled by relay coil 269 and contacts 268. With the contacts 264 closed, once relay coil 258 is energized it will remain "locked in" and energized until contacts 264 open.

The relay coil 269, which controls the energization of relay coil 258 and thus the starting of the package stacking operation is controlled through a complex circuit.

As stated previously there is a six pack and twelve pack selector switch 270 which can be operated to close a first set of contacts 271 or a second set of contacts 272. Assuming first that only six packages will be placed into an outer shipping case, contacts 272 are open and contacts 271 are closed. The relay coil 269, which in turn operates the stacking pusher, is controlled through a circuit which includes a limit switch 275 operated by the elevator when the elevator is up. The limit switch 275 has one normally open set of contacts 276 and one normally closed set of contacts 277. The physical position of limit switch 275 is shown in FIG. 9. When the elevator platform 66 is up and in position to receive packages from the step deck the first contacts 276 of limit switch 275 are closed.

A first side of contacts 276 is electrically connected to line 195. A second side of contacts 276 is electrically connected to a wire 326 at junction 273. Wire 326 is electrically connected to a first side of the contacts of limit switch 250. A stated previously, with two packages on the top step platform limit switch 250 is closed. A second side of the contacts of limit switch 250 is electrically connected to a first side of a first normally closed set of contacts 278 of a limit switch 279. The limit switch 279 has a second set of normally open contacts 280 which control another function of the machine. As can be seen in FIG. 4 the limit switch 279 is located on the stop fence 167 and is operated whenever there is a stack of packages on elevator platform 66. Thus, if the elevator platform 66 is up and there are no packages on the platform, contacts 278 will be closed.

With the cross head in its home position a second set of contacts 287 of limit switch 274 is closed. This set of contacts is connected to line 195 and to a solenoid coil 288, which when energized, operates a valve to direct fluid under pressure to cylinder 156 and thereby raises the fingers 154. To insure that the fingers are up before the cross head operates, as seen in FIG. 9, a limit switch 285 is operated and closed whenever the fingers 154 are up and the cross head is in its rearward position. One side of a second set of contacts 278 of limit switch 279 is electrically connected to a first side of limit switch 285. The second side of limit switch 285 is electrically connected to one side of relay coil 269. The other side of relay coil 269 is electrically connected to line 196, thus completing the circuit to the coil. Thus, with the selector switch 271 in the six pack position, and with first contacts 276 of limit switch 275 closed, limit switch 250 closed, first contacts 278 of limit switch 279 closed and with limit switch 285 closed, the relay coil 269 be energized. This will cause contacts 268 to close energizing relay coil 258. The contacts 260 and 267 will close and contacts 259 will open. The electric brake 261 will be released and the electric clutch 262 will be energized thus causing motor 168 to drive gear reducer 170 which in turn will drive the chain 161 and consequently cross head 152 in direction as indicated by arrow 160.

The circuit energizing relay coil 269 will remain completed until the cross head 152 has moved far enough so that the packages on top step platform 55 clear the limit switch 250, which opens and breaks the circuit to the relay 269. The contacts 268 will open. However the cross head will have moved away from the limit switch 281 and contacts 264 will then be closed. The contacts 267 are closed as long as relay 285 is energized and therefore an independent hold circuit for relay 258 is completed. The relay 258 will remain energized until the cross head contacts limit switch 274 and close contacts 264, the hold circuit to relay coil 258 will remain completed and the cross head will continue to be driven.

When the cross head 152 goes to the extreme right as shown in FIG. 9 it contacts a limit switch 290 and closes this switch. With the case loader 181 in its retracted position as shown in solid lines in FIG. 10 limit switch 291 is contacted and is also closed. A first side of limit switch 291 is electrically connected to line 195. A second side of limit switch 291 is electrically connected to a line 320 that in turn is electrically connected to a first side of contacts 277. A first side of limit switch 290 is electrically connected to line 320 at junction 292. A second side of switch 290 is electrically connected to a line 293 which in turn is electrically connected to a first side of a solenoid coil 294. The second side of the coil 294 is connected to line 196. The solenoid coil 294, when energized, operates a valve that directs fluid under pressure to the cylinder 156 and thus lowers the fingers 154 to position as shown in dotted lines at 286.

A solenoid coil 295 is electrically connected to line 293 at junction 296 and is also connected to line 196. Therefore solenoid coils 294 and 295 are operated in parallel and work simultaneously. Solenoid coil 295 operates a valve 297 to direct fluid under pressure to cylinder 70 and lower the platform 66.

The case loader mechanism is automatically returned to its retracted position as will be explained more fully later, and thus limit switch 290 is normally closed all during the stroke of the stacking pusher mechanism. When the cross head 152 contacts limit switch 290 the circuit to both solenoid coils 294 and 295 will be complete and they will be energized. Their respective valves will be moved and fingers 154 will be moved to their down position as shown in dotted lines at 286. Also the elevator platform 166 will be lowered to position as shown in dotted lines in FIG. 9.

As previously mentioned the hold circuit for relay 258 will remain completed and the cross head will continue to run until it once again reaches its home position contacting limit switch 274. When it contacts limit switch 274 the contacts 264 open and the circuit to the relay coil 258 is broken. The electric clutch 262 is then de-energized. The cross head is stopped in this "home" position until the relay coil 269 is again energized as previously described.

With the selector switch 270 in its position for loading six packages at a time to a shipping case, the case loader cross head 181 will be operated when a circuit as follows is completed. As shown, the first set of contacts 271 of the six pack selector switch will be closed. The six pack selector switch is connected to line 195 and is also electrically connected, at junction 299, to a line 300 which is electrically connected between a second side of contacts 280 of limit switch 279 and a first side of a limit switch 301. The contacts 271 are wired in parallel with contacts 280.

Limit switch 301 is a normally open limit switch which is closed when the elevator is in its down or lowered position illustrated in FIG. 10. The physical location of limit switch 301 is shown schematically in FIGS. 10 and 4. The second side of limit switch 301 is electrically connected with a line 302 to a first side of a limit switch 303. Limit switch 303 is a normally open limit switch which is physically located as shown in FIG. 4, and is closed whenever an outer shipping case 76 is positioned on the loading chute ready to receive a stack of packages. A second side of limit switch 303 is electrically connnected to a solenoid coil 304 which is also connected to line 196.

Solenoid coil 304 operates a suitable valve 305 in direction so that the valve directs fluid under pressure through a conduit 306 to cylinder 183. Cylinder 183 then moves case loading cross head 181 in direction as indicated by arrow 187 and pushes a stack of packages, in this instance six packages, into the shipping case 76.

While this is going on, the stacking pusher is returning to its home position, and the pusher mechanism for the shingling deck is also operating as previously described. Thus many of the functions of the machine happen concurrently and the process is very rapid.

As soon as the case loading cross head 181 has moved the packages in the stack sufficiently far so that the packages clear the elevator platform 66 the cross head 181 contacts a limit switch 315 which is connected to main power line 195 at a first side thereof and is electrically connected at a second side thereof to a solenoid coil 317 which in turn is electrically connected to line 196. The solenoid coil 317 operates a valve 297 to direct fluid under pressure to the elevator cylinder 70 and move the elevator platform 66 to its up position.

The case loading cross head cylinder 183 is returned as soon as its work stroke is completed. This is accomplished through use of a pilot operated control valve 319. Once the cylinder completes its stroke the valve 319 moves to position to direct fluid under pressure to the rod end of the cylinder and it will return automatically to its home position and close limit switch 291. As soon as the elevator starts to raise the circuit to solenoid coil 304 is broken and the valve 305 will return to neutral.

It can thus be seen from this description of the operation of the machine that all of the components are interlocked electrically so that there is no interference between any of the various functions of the machine. All of the valves for the cylinders are spring loaded to return to neutral when their respective solenoids are not energized. The cylinders are locked in position with the valves in neutral, except valve 205 which permits reverse flow so that a separate valve 319 can return this cylinder home.

With the selector switch 270 in the twelve pack position the only functions of the machine which are affected are the operation of the stacking pusher and the operation of the case loading cross head 181. With the switch 270 in the twelve pack position second contacts 272 are closed and first controls 271 thereof are open. This makes the circuit for operating the stacking pusher such that when the first stack of six packages has been placed on the elevator and the elevator has been lowered, as previously described, the case loader will not operate. This is because second contacts 280 of limit switch 279 will be open. As mentioned previously this switch is electrically connected to line 195 and through line 300 to limit switch 301. In order for the case loader to be operated contacts 280 must close as the contacts 271, which are connected in parallel with contact 280 are permanently opened.

Once the second set of six packages has been positioned on the step deck by the shingling deck pusher mechanism, the stacking pusher will be operated through a separate circuit. It is to be remembered that switch 270 is in the twelve pack position and that the case loader did not put the initial six packages into a shipping case. Thus the limit switch 315 was not closed and the elevator platform 66 will remain in its down position with the first stack of six packages on the top thereof. The upper surface of the top packages, which are packed three high and two deep, will be on the same level as the platform 66 is when the elevator platform is in its raised position.

It can be seen that the packages pushed off the step deck will come to rest on top of the packages that are on the elevator platform.

Thus, where previously contacts 276 of switch 275 were closed because the elevator was in an up position the contacts 276 are now open because the elevator remains in its down position. Therefore, independent circuitry in parallel with contacts 276 must be completed before the relay 269 is energized, which, as explained previously, causes the electric clutch 262 to be energized and thereby drives the stacking pusher.

As previously explained, a first side of limit switch 291 is electrically connected to line 195. Limit switch 291 is closed when the case loading cross head 181 is in its home position. As previously explained the cross head 181 returns home automatically and thus the switch 291 is in a closed position except when the cross head is being actuated to load a shipping case.

Line 320, which is electrically connected to a second side of limit switch 291, is also electrically connected to a first side of contacts 277 of switch 275. The contacts 277 are normally closed and, when the elevator is in its lowered position, will be closed. The contacts 277 are open when the elevator is raised.

A second side of contacts 277 is electrically connected through a wire 321 to a first side of contacts 272 of the twelve pack selector switch. These contacts will be closed with the selector switch in the twelve pack position.

The second side of contacts 272 is electrically connected through a wire 322 to a first side of a limit switch 325. The limit switch 325 is normally open but is closed when there is a stack of packages on the elevator platform 66 and the elevator platform is in its lowered position. The second side of switch 325 is electrically connected to wire 326 which in turn is electrically connected to switch 250.

The rest of the circuit is exactly as listed before, switch 250 being closed when a package on the top platform of the step deck is against the fence. Contacts 279, which are normally closed, are closed whenever there is no packages on the upper level of the platform. These contacts 279 are opened if a second set of six packages is positioned on top of the first set of six packages with the elevator in the lower position or if the elevator was in its raised position and only one stack of six packages was positioned thereon. With the contacts 279 open the stacking pusher cannot operate. This prevents a second set of packages from being moved from the step platform onto the elevator platform if the elevator and case loading cross head have not functioned in their normal normal sequence.

However, in normal operation with a first stack of six packages on the elevator and with the elevator platform 66 in its lowered position the contacts 279 will be closed. The contacts 279 are electrically connected to switch 285 which, as stated previously, is actuated and closed when the pusher fingers 154 are up in position to contact the packages on the step deck.

With the circuit complete to relay coil 269 the relay will be energized and close contacts 268 thus energizing relay 258 and the electric clutch 262.

The stacking pusher cross head 152 will then move in direction as indicated by arrow 160 as explained previously, and a second stack of six packages will be placed on top of a first stack of six packages. When this occurs the case loader cross head will be operated. A first side of second contacts 280 of switch 279 is electrically connected to line 195. The contacts 280 will close when the second stack of six packages is placed on top of the first stack of six packages. The packages themselves operate this switch and close the contacts.

A second side of the contacts 280 is electrically connected to line 300 which in turn is electrically connected to a first side of limit switch 301. The limit switch 301 is closed when the elevator is down, as it would be when the second stack of packages is placed on top of the first stack of packages. The second side of limit switch 301 is electrically connected through a line 302 to a limit switch 303 which is closed when a shipping case is in position and ready to be packed with a stack of twelve packages. Thus, with the contacts 271 out of the circuit, the contacts 280 of switch 279 have to be closed before the case loader will operate.

Once the circuit through contacts 280, limit switch 301 and limit switch 303 is completed the solenoid coil 304 will be energized and solenoid 304 will move valves 318, 305 to position so that fluid under pressure will be directed into cylinder 183 and the case loader will pack the stack of twelve packages into the outer shipping case.

The machine then will recycle as before.

As many widely apparently different embodiments of this invention may be made without departing from the spirit and scope thereof, it is to be understood that we do not limit ourselves to the specific embodiments herein.

What is claimed is:
1. A machine for arranging a plurality of packages into a stack more than one package high, said machine including:
 a first supporting surface having a longitudinal direction and being of a size to support at least two packages that are to be stacked,
 at least two offset supporting surfaces transversely aligned with said first supporting surface,
 separate guide means extending between said first supporting surface and each of said offset supporting surfaces,
 means for moving each of the packages from said first supporting surface along said guide means to one of said offset supporting surfaces, said offset surfaces being offset so that the adjacent ends of packages resting on said offset supporting surfaces are offset a distance slightly greater than the height of the packages, and means for moving first the package on an end offset supporting surface on top of the package on the adjacent offset supporting surface.

2. An apparatus for arranging packages into a stack comprising a main frame, a longitudinally inclined supporting surface on said main frame, an infeed conveyor for moving packages onto said inclined surface, a plurality of step like platforms alined with and transversely spaced from said inclined supporting surface, separate guide means extending between said inclined supporting surface and each of said step platforms, pusher means for engaging each package on said inclined supporting surface and moving it along one of said guide means to position on one of said step platforms, means for engaging first the package on an uppermost of said step platforms and subsequently, in order, the packages on the next lower of said platforms to move the packages on said platforms into register to form a stack of packages, and means for removing said stack of packages from said apparatus.

3. The combination as specified in claim 2 wherein said step platforms are vertically offset.

4. The combination as specified in claim 2 wherein said means for removing said stack of packages from said machine includes pusher means for inserting said stack into a shipping case aligned with the stack of packages.

5. The combination as specified in claim 4 and releasable means for selectively stopping the packages from moving from said infeed conveyor onto said inclined surface.

6. A machine for arranging a plurality of coplanar packages into a stack and placing said stack into an outer shipping case, said machine including:

a main frame, said main frame having a first supporting surface, means for moving said packages onto said first supporting surface, a plurality of offset step platforms mounted on said main frame and transversely spaced from said first supporting surface, separate package guide means extending from said first supporting surface to each of said step platforms, mechanical pusher means comprising a pair of spaced apart chains mounted over provided sprockets and having a shaft rotatably mounted with respect to, and extending between and moved by said chains, a plurality of paddles mounted along said shaft, each of said paddles being adapted to engage one package on said first supporting surface, said chains being driven in direction so that each of said paddles engages and moves its respective package simultaneously along one of said guide means onto a separate step platform, stack receiving means aligned with and adjacent an end one of said step platforms, stacking pusher means for engaging first the package on the end step platform opposite from said stack receiving means and subsequently each succeeding package as said pusher means moves in direction toward said stack receiving means and for moving said packages sequentially into register one with another to form a stack of packages to be received by said stack receiving means, and means for engaging said stack of packages on said stack receiving means and moving said stack away from said stack receiving means.

7. The combination as specified in claim 6 wherein said step platforms are vertically offset.

8. The combination as specified in claim 7 wherein said stack receiving means is comprised of a stack receiving platform horizontally aligned with the lower-most of said step platforms, means for lowering said step platform to position wherein the upper surface of the top package of said stack is substantially co-planar with the lower-most step platform and means for moving said stack into an outer shipping case with said platform in said lowered position.

9. The combination as specified in claim 8 wherein said stacking pusher means is controlled to operate only after two packages are positioned in each of said step platforms.

10. A machine for arranging a plurality of co-planar packages into a vertical stack and placing said stack into an outer shipping case, said machine including:

a main frame, said main frame having an inclined supporting surface, an infeed conveyor for moving a plurality of packages from a supply onto and along said inclined surface, a plurality of vertically offset aligned step platforms mounted on said main frame and transversely spaced from said inclined supporting surface, separate package guide means extending from said inclined supporting surface to each of said step platforms, mechanical pusher means for simultaneously moving a plurality of packages from said inclined supporting surface each along one of said guide means onto a separate step platform, a stack receiving platform aligned with, lying in the plane of and adjacent the lowermost of said step platforms, stacking pusher means for engaging first the uppermost package and subsequently each succeeding lower package on said step platforms and moving said packages to register one with another to form a stack and move said stack in direction toward said stack receiving platform, a shipping case holder aligned with said stack receiving platform, and case loading pusher means for engaging said stack of packages on said stack receiving platform and moving a provided stack into said outer shipping case on said shipping case holder.

11. The combination as specified in claim 10 and means to lower the stack receiving platform when a first stack of packages is placed thereon and electric interlock means which prevent said case loading pusher from operating until a second stack of packages is placed on top of the first stack.

12. The combination as specified in claim 11 wherein: said stacking pusher means includes at least one cross rail mounted below the step platforms and aligned with the packages on the step platforms, a cross head mounted for movement along said cross rail, at least two fingers mounted with respect to said cross head and movable between a lowered position and an upright position in which said fingers are in position to move said packages into register one with another when said cross head moves along said rail in a first direction, means for driving said cross head along said rail in said first direction, and means for returning said cross head to a starting position when said stack of packages is in place on said stack supporting platform.

13. The combination as specified in claim 12 and means to move said fingers to their lowered position as said cross head moves in direction opposite from said first direction.

14. The combination as specified in claim 11 wherein said mechanical pusher means for moving said packages along said guide means includes:

a drive shaft rotatably mounted with respect to said main frame and positioned below and adjacent said inclined supporting surface, an idler shaft rotatably mounted on said main frame adjacent said step platforms and positioned parallel to said drive shaft, a separate pair of longitudinally spaced sprockets drivably mounted on each of said shafts, and each aligned with a sprocket of the opposite pair, a pair of spaced chains drivably mounted on aligning sprockets of the opposite pairs of sprockets, a cross shaft extending between and attached to said chains, a plurality of paddles, one for each of the packages to be moved along said guide means, said paddles being attached to said cross shaft and extending to be in a package engaging position, and motor means for driving said drive shaft in direction so that each of said paddles moves first to engage a package on said inclined surface and move said package along its respective guide means to its respective step platform.

15. The combination as specified in claim 14 and means to clamp and hold a package coming from said input conveyor to prevent the package on the conveyor from moving up said inclined surface until after said paddles are clear of said inclined surface.

16. A combination as specified in claim 15 wherein the head package on said inclined surface engages a backup member and said backup member moves to lead package clearing position after said clamp member has clamped the packages on the infeed conveyor.

17. The combination as specified in claim 16 wherein movement of said backup member away from the lead package is controlled by electrical circuit means which is completed whenever said clamp means on said conveyor operates to prevent packages from moving from said conveyor onto said inclined surface.

18. The combination as specified in claim 14 wherein a paddle idler shaft is positioned parallel to and spaced from said cross shaft and said paddle idler shaft extends between and is pivotally attached to said chains, said paddle idler shaft being in trailing relationship to said cross shaft with reference to direction of movement of said paddles, said paddles being fixedly attached to said cross shaft and at least one paddle having a second portion thereof extending in direction opposite from the package engaging portion of said paddle, and a drag link pivotally mounted to the second portion of the paddle and being mounted to said paddle idler shaft, the geometry of said paddle idler shaft, said drag link, said second portion of said paddle and said paddle cross shaft being such that said package engaging portion of each of said paddles remains substantially parallel to the surface of the package engaged by said paddles as said paddles engage and disengage said packages during the pusher operation.

19. The combination as specified in claim 18 wherein said means for driving said drive shaft of said paddle assembly is connected through an electrically controlled clutch, and circuit means to disable said clutch whenever said step platforms are loaded with packages.

References Cited by the Examiner

UNITED STATES PATENTS 2,141,212 12/1938 Kimball et al. _____ 53—159 X

FOREIGN PATENTS 1,003,643 2/1957 Germany.

FRANK E. BAILEY, *Primary Examiner.*

TRAVIS S. McGEHEE, *Examiner.*